(12) United States Patent
Siebers et al.

(10) Patent No.: US 10,562,808 B2
(45) Date of Patent: Feb. 18, 2020

(54) HIGHLY CRYSTALLINE LITHIUM ALUMINIUM SILICATE GLASS-CERAMIC AND ITS USE

(71) Applicant: SCHOTT AG, Mainz (DE)

(72) Inventors: Friedrich Siebers, Nierstein (DE); Bernd Ruedinger, Woerrstadt (DE); Falk Gabel, Schlangenbad (DE); Evelin Weiss, Mainz (DE)

(73) Assignee: SCHOTT AG, Mainz (DE)

( * ) Notice: Subject to any disclaimer, the term of this patent is extended or adjusted under 35 U.S.C. 154(b) by 392 days.

(21) Appl. No.: 14/934,680

(22) Filed: Nov. 6, 2015

(65) Prior Publication Data

US 2016/0130175 A1    May 12, 2016

(30) Foreign Application Priority Data

Nov. 6, 2014 (DE) .................. 10 2014 222 645

(51) Int. Cl.
*C03C 10/00* (2006.01)
(52) U.S. Cl.
CPC ................. *C03C 10/0027* (2013.01)
(58) Field of Classification Search
None
See application file for complete search history.

(56) References Cited

U.S. PATENT DOCUMENTS

| | | | |
|---|---|---|---|
| 4,341,543 A | 7/1982 | Andrus | |
| 5,173,453 A * | 12/1992 | Beall | C03C 10/0027 501/4 |
| 6,750,167 B2 * | 6/2004 | Kitamura | C03C 10/0027 501/4 |
| 2002/0023463 A1 * | 2/2002 | Siebers | C03C 3/085 65/99.5 |
| 2005/0143246 A1 * | 6/2005 | Comte | C03C 3/085 501/4 |
| 2005/0252503 A1 * | 11/2005 | Siebers | C03C 10/0036 126/1 R |
| 2007/0232476 A1 * | 10/2007 | Siebers | C03C 3/095 501/4 |
| 2007/0259767 A1 | 11/2007 | Siebers et al. | |
| 2014/0357468 A1 * | 12/2014 | Siebers | C03C 3/095 501/32 |

FOREIGN PATENT DOCUMENTS

| | | |
|---|---|---|
| CA | 2299202 | 8/2000 |
| DE | 102004024583 A1 | 12/2005 |
| DE | 102012202697 | 8/2013 |
| DE | 102012202697 A1 | 8/2013 |
| EP | 1837313 | 9/2007 |
| EP | 1837313 A1 | 9/2007 |
| JP | H09188538 | 7/1997 |
| JP | 2000247681 | 9/2000 |
| WO | 2005058766 A1 | 6/2005 |
| WO | WO-2013124373 A1 * | 8/2013 ............. C03C 3/095 |

OTHER PUBLICATIONS

Bach, et al. Low Thermal Glass Ceramics, pp. 17-18, Nov. 11, 2018. (Year: 2018).*
Beall et al., "Nanophase Glass-Ceramics", Journal of the American Ceramic Society, vol. 82, No. 1, 1999, pp. 5-16.
Bach, et al. "Low Thermal Expansion Glass Ceramics", Schott Series on Glass and Glass Ceramics, Springer, Second Edition, 2005, pp. 8-21.

* cited by examiner

*Primary Examiner* — Christopher M Rodd
(74) *Attorney, Agent, or Firm* — Ohlandt, Greeley, Ruggiero & Perle, L.L.P.

(57) ABSTRACT

A highly crystalline transparent, translucent or opaque lithium aluminium silicate (LAS) glass-ceramic which has a proportion of residual glass phase of less than 20% by weight and also the use thereof is described.

20 Claims, 1 Drawing Sheet

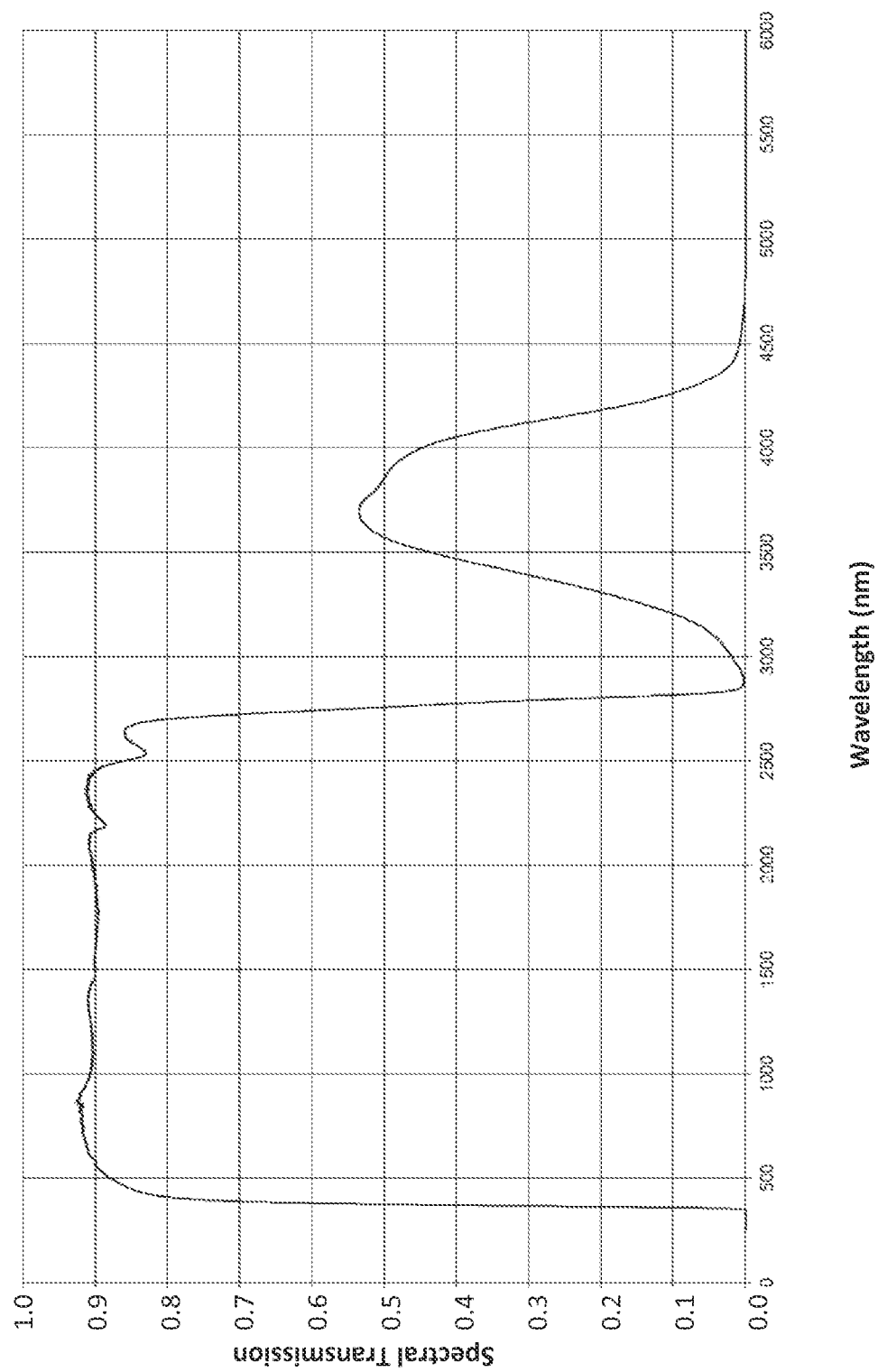

HIGHLY CRYSTALLINE LITHIUM ALUMINIUM SILICATE GLASS-CERAMIC AND ITS USE

CROSS REFERENCE TO RELATED APPLICATIONS

This application claims the under 35 U.S.C. § 119(a) of German Patent Application No. 10 2014 222 645.7 filed Nov. 6, 2014, the entire contents of which are incorporated herein by reference.

BACKGROUND

1. Field of the Invention

The invention relates to a highly crystalline lithium aluminium silicate glass-ceramic and to the use of such an LAS glass-ceramic.

2. Description of Related Art

It is known that glasses from the system $Li_2O$—$Al_2O_3$—$SiO_2$ can be converted into glass-ceramics having high-quartz mixed crystals and/or keatite mixed crystals as main crystal phases. For the first type of glass-ceramics, the synonyms "β-quartz" or "β-eucryptite" and for the second type "β-spodumene" may also be found as designation for the crystal phases in the literature.

A key property of these glass-ceramics is that they have an extremely low coefficient of thermal expansion $\alpha_{20/700}$ in the temperature range from room temperature to about 700° C. of usually less than $1.5 \cdot 10^{-6}$/K. Glass-ceramics having high-quartz mixed crystals as main crystal phase have lower coefficients of expansion in the region of their use temperatures, usually about $0 \pm 0.3 \cdot 10^{-6}$/K, while the glass-ceramics having keatite mixed crystals as main crystal phase have values of from about $0.8 \cdot 10^{-6}$/K to $1.5 \cdot 10^{-6}$/K. The two types of glass-ceramic also differ in terms of their average crystallite sizes. Glass-ceramics having high-quartz mixed crystals can, owing to their low crystallite size of usually less than 50 nm, be produced in transparent form or transparent coloured form. Those having keatite mixed crystals as main crystal phase usually have average crystallite sizes above 100 nm and are translucent to opaque because of the resulting light scattering.

The glass-ceramics can be coloured by addition of colouring oxides such as $V_2O_5$, CoO, NiO, $Fe_2O_3$, $Cr_2O_3$, $MnO_2$, $CeO_2$, either individually or in combination, in order to produce, for example, black cooking surfaces having a particular transmission profile.

Owing to the low thermal expansion at their use temperatures, these glass-ceramics have excellent temperature difference resistance and temperature change resistance and also constancy of dimensions. The high transformation temperature of the residual glass phase makes high use temperatures possible. In order also to increase the mechanical strength against scratching, bending and impact stresses and also bombardment with projectiles, a highly crystalline microstructure is advantageous. This means that a high proportion of crystal phase combined with a low proportion of residual glass phase should be sought.

Apart from the residual glass phase and the main crystal phase composed of high-quartz or keatite mixed crystals, the glass-ceramic contains the crystal nuclei as secondary crystal phase. These usually consist of $ZrO_2/TiO_2$ mixed crystals. $SnO_2$ can also participate in nucleation and be a constituent of the mixed crystals. The proportion of the crystal nuclei phase is in the range from 2% by weight to 5% by weight. Sufficient nucleation takes place in this range and uncontrolled devitrification can be avoided.

In the industrial production of glass-ceramics, the crystallisable starting glass is firstly melted from a mixture of glass fragments and pulverulent mix raw materials at temperatures of usually from 1550° C. to 1700° C. and refined. Refining agents used are usually arsenic oxide and/or antimony oxide and more recently for environmentally friendly refining tin oxide. To improve the bubble quality, high-temperature refining at above 1700° C. can also be used. Arsenic oxide is advantageous for transparent glass-ceramics because of high light transmission and low colour of the glass-ceramic.

After melting and refining, the glass usually undergoes hot forming by casting, pressing or by means of rolling or floating in order to produce plates.

In a subsequent heat treatment process, the starting glass is converted into the glass-ceramic article by controlled crystallization. This ceramisation is carried out in a two-stage heat treatment process in which nuclei, usually composed of $ZrO_2/TiO_2$ mixed crystals, are firstly produced by nucleation at a temperature in the range from 680° C. to 800° C. When the temperature is subsequently increased, the high-quartz mixed crystals grow on these nuclei at the crystallisation temperature of from 800° C. to 950° C.

At the maximum production temperature, the microstructure of the glass-ceramics is homogenised and the optical, physical and chemical properties are set.

If desired, the high-quartz mixed crystals can subsequently be converted into keatite mixed crystals. The transformation into keatite mixed crystals is effected by increasing the temperature to a temperature range of from about 950° C. to 1250° C. The transformation increases the coefficient of thermal expansion of the glass-ceramic, and light scattering occurs as a result of further crystal growth, leading to a translucent to opaque appearance. The transformation increases the crystallinity and the glass-ceramics become stronger.

Transparency and a low intrinsic colour are critical for the optical quality of transparent glass-ceramics having high-quartz mixed crystals as main crystal phase. Transparency means that the glass-ceramics should have a high light transmission in the visible range and also low light scattering (clouding).

The light transmission measured in the CIE colour system as light transmission Y (brightness) should therefore be very high. The coloration of the transparent low-colour lithium aluminium silicate glass-ceramic, usually reported as chroma c* in the CIELAB colour system, should be low so that the colour when looking through the glass-ceramic at objects, colour layers and also the colour of displays is not falsified.

The transparent glass-ceramic should not have any visually undesirable light scattering so that the view through to objects and illuminated displays is not falsified. The displays under the glass-ceramic plate should be clearly visible, the contours should be sharp and be able to be seen without clouding.

The low light scattering is achieved, inter alia, by means of a high density of nuclei which leads to the high-quartz mixed crystals which grow on to have a size below the range of the wavelength of visible light. The average crystallite size of the high-quartz mixed crystals is typically in the range from 20 nm to 50 nm. A high density of nuclei requires sufficient contents of nucleating agents and also sufficient nucleation times during ceramisation. Furthermore, low double refraction of the crystals and good matching of the refractive indices of crystals and residual glass phase are necessary for low scattering. These conditions for high transparency of LAS glass-ceramics are set forth in the article "Nanophase Glass-Ceramics, Journal of the American Ceramic Society, Vol. 82, No. 1, pp. 5-16; 1999 by the authors Beall and Pickney.

The refractive index of the residual glass phase is determined by its composition and the cooling rates in ceramisation.

The intrinsic colour of transparent glass-ceramic plates can have various causes. Colour-imparting Fe ions are present as impurity in the mix raw materials for melting. The brownish yellow intrinsic colour of the transparent glass-ceramics is mainly due to electronic transitions in colour complexes which absorb in the short-wavelength region of visible light and in which the component $TiO_2$, which is necessary for nucleation, participates. The most frequent absorbing colour complex is the formation of adjacent Fe and Ti ions, between which electronic charge transfer transitions take place. Sn/Ti complexes likewise bring about an intrinsic colour. The formation of these colour complexes takes place, in particular, during ceramisation of the glass-ceramics. Absorption in the short-wavelength part of the visible spectrum gives the transparent glass-ceramics a distinct intrinsic colour which increases greatly with increasing thickness.

Absorption and scattering are the optical phenomena which have to be controlled in economical production.

In order to ensure sufficient formation of nuclei, minimum contents of the nucleating agent $TiO_2$ are necessary since this nucleating agent can be replaced by the alternative nucleating agents $ZrO_2$ and $SnO_2$ only with disadvantages during melting and shaping.

In order to reduce the concentrations of the colour complexes, it is advantageous to shorten the nucleation and crystallization times. On the other hand, shortening of the nucleation time can lead to increased light scattering and shortening of the crystallisation time can lead to unevennesses on the product surface.

In numerous applications of glass-ceramics, these are acquired in the form of plates, depending on the application in thicknesses of from about 1 mm to 20 mm. The plates can be three-dimensionally moulded by hot after-working of the crystallisable glasses or during ceramisation.

For economic reasons, it is advantageous for both transparent glass-ceramics having high-quartz mixed crystals as main crystal phase and also translucent or opaque glass-ceramics having keatite mixed crystals as main crystal phase to be able to be produced from the same composition of the crystallisable lithium aluminium silicate glass. This can be achieved, in the case of suitable compositions, by the configuration of the ceramisation process, in particular by the choice of maximum temperature and hold time. The different property combinations of the two glass-ceramic embodiments enable many applications to be provided for advantageously.

For economical production of the glass-ceramics, a low melting temperature and a low processing temperature $V_A$ of the starting glasses are desirable. Furthermore, the glass must not display any devitrification during shaping, i.e. interfering crystals which impair the strength of the starting glasses and glass-ceramics produced therefrom must not be formed.

Thus, WO 2005/058766 A1 describes transparent, translucent or opaque glass-ceramics containing high-quartz or keatite mixed crystals. These glass-ceramics have high proportions of residual glass phase. These are disadvantageous for the mechanical properties and the temperature stability.

SUMMARY

It is an object of the invention to discover lithium aluminium silicate glass-ceramics which have a high crystallinity combined with low proportions of residual glass phase and, at the same composition of the crystallisable starting glasses, consist of high-quartz or keatite mixed crystals as main crystal phase depending on the choice of the production conditions. The glass-ceramics should have economical manufacturing properties, especially in respect of the melting and shaping temperatures of the starting glasses, for example inexpensive mix raw materials, low melting and shaping temperatures, devitrification resistance and short ceramisation times.

It is also an object of the invention to discover uses for the articles produced from the LAS glass-ceramics.

Here, the glass-ceramics should meet the requirements of the various uses in terms of, for example, chemical resistance, mechanical strength, transmission, heat resistance and long-term stability in respect of changes in their properties (e.g. thermal expansion, transmission, build-up of stresses).

For many applications in which a low weight of the article is important, a low density of the glass-ceramic is also advantageous.

These objects are achieved by a lithium aluminium silicate glass-ceramic as disclosed herein and the use thereof.

In order to meet this wide variety of requirements, it was found that the microstructure of the glass-ceramic should be and can be set in a targeted manner. The approach on which the invention is based is to set the microstructure of the glass-ceramic, i.e. crystallite phase and residual glass phase, in a targeted manner and to minimise the proportion of residual glass phase. The content of residual glass phase should be less than 20% by weight, preferably less than 18% by weight. Here, the components which form the crystal phases and those which preferentially go into the residual glass phase are of key importance. In order to achieve a high crystallinity of the glass-ceramic, i.e. a high proportion of crystal phase and a low proportion of residual glass, it is advantageous to increase the content of the components which are incorporated into the mixed crystals relative to those which remain in the residual glass phase.

The contents concerned have to be carefully matched since proportions of residual glass formers which are too low result in undesirable crystallisation (devitrification) during shaping of the glass.

To modify the abovementioned properties, the amount and composition of the residual glass phase is of critical importance. When an article is subjected to heat, the temperature will act locally differently (magnitude, duration). This can result in locally different changes in the density (compaction) and to stresses in the article. The low proportion of residual glass according to the invention is therefore advantageous for low compaction, which causes dissipation of stresses under the action of heat.

In a first embodiment, the highly crystalline LAS glass-ceramic contains, as main constituents, the components (in % by weight on an oxide basis):

| | |
|---|---|
| $Li_2O$ | >4.0-4.6 |
| $Na_2O + K_2O$ | 0-<0.4 |

-continued

| | |
|---|---|
| MgO | 0.2-0.8 |
| CaO + SrO | 0.05-1.0 |
| BaO | 0-<0.5 |
| ZnO | 1.0-2.0 |
| $Al_2O_3$ | 19-23 |
| $SiO_2$ | 66-<70 |
| $TiO_2$ | 2.0-2.4 |
| $ZrO_2$ | 1.6-<2.0 |
| $SnO_2$ | 0-0.4 |
| $P_2O_5$ | 0-3 |
| $B_2O_3$ | 0-1.0 | and optionally additions of chemical refining agents such as $As_2O_3$, $Sb_2O_3$, $CeO_2$ and of refining additives such as manganese oxide, sulphate compounds, chloride compounds, fluoride compounds in total contents of up to 2.0% by weight.

Cerium oxide and antimony oxide are preferably dispensed with since these form colour complexes which absorb in transparent glass-ceramics with the nucleating agent $TiO_2$ present.

The oxides $Li_2O$, $Al_2O_3$ and $SiO_2$ within the narrow limits indicated are constituents of the high-quartz and keatite mixed crystals.

The minimum content of $Li_2O$ of more than 4% by weight is necessary for a high crystallinity and is advantageous for low melting and shaping temperatures. Contents higher than 4.6% by weight are disadvantageous because the crystallisation of the glass-ceramic is then difficult to control, and also because of the high costs of Li raw materials.

The content of $Li_2O$ is preferably at least 4.1% by weight in order to set a high crystallinity.

In order to avoid relatively high viscosities of the starting glass and devitrification of mullite during shaping, the $Al_2O_3$ content is limited to a maximum of 23% by weight. The minimum content for the formation of sufficient amounts of the crystal phase is 19% by weight.

The $SiO_2$ content should be less than 70% by weight and preferably not more than 69% by weight because this component greatly increases the viscosity of the glass and thus the melting temperature and shaping temperature $V_A$. For good melting of the glasses and for low melting and shaping temperatures, high contents of $SiO_2$ are uneconomical. The content of $SiO_2$ should be at least 66% by weight because this is advantageous for the required properties such as high crystallinity, chemical resistance, mechanical strength, thermal properties and low density.

The addition of the alkalis $Na_2O$ and $K_2O$ and also the alkaline earths CaO, SrO, BaO improves the fusibility and the devitrification resistance during shaping of the glass. The melting of sparingly soluble raw materials for $ZrO_2$ and $SiO_2$ is accelerated, and the melting temperature and the processing temperature are reduced. However, the contents must be limited because these components are not incorporated into the crystal phases but remain in the residual glass phase of the glass-ceramic. In this way, the property of a low residual glass phase, which is important for the invention, can be achieved. Higher contents have an adverse effect on mechanical properties and the long-term stability heat resistance of the glass-ceramic. The sum of the alkali metal oxides $Na_2O$ and $K_2O$ is from 0 to <0.4% by weight, preferably not more than 0.3% by weight and preferably at least 0.05% by weight.

The sum of the alkaline earth metal oxides CaO and SrO is at least 0.05% by weight, preferably at least 0.1% by weight. It is not more than 1% by weight, preferably not more than 0.8% by weight. The glass-ceramic should contain these components as residual glass constituents within the limits indicated. CaO and SrO are, as constituents of the residual glass phase, more advantageous in terms of mechanical and thermal properties than the alkalis $Na_2O$ and $K_2O$ and are necessary for favourable manufacturing properties. The BaO content is from 0 to <0.5% by weight, preferably from 0 to 0.3% by weight, because this component increases the density.

Proportions of MgO and ZnO are incorporated into the mixed crystals of the high-quartz type and into those of the keatite type. A minimum MgO content of 0.2% by weight is required because this component is particularly effective for reducing the melting temperature (represented by the $10^2$ temperature). This is the temperature at which the viscosity of the molten glass composition is $10^2$ dPas. This property is important for economical production. The MgO content is limited to a maximum of 0.8% by weight. Higher MgO contents are disadvantageous because they increase the expansion coefficient of the glass-ceramics unacceptably and MgO is also incorporated into the residual glass phase. The component ZnO has been found to be particularly advantageous for the transparency of the glass-ceramic and, together with $Li_2O$, allows low and even negative thermal expansions to be set. The ZnO content should be at least 1% by weight. The ZnO content is limited to a maximum of 2% by weight because of the tendency to vaporise during melting and shaping. Preference is given to a content of from 1.1% by weight to 2% by weight.

$TiO_2$, $ZrO_2$ and optionally $SnO_2$ are provided as nucleating agents. During nucleation, the components form mixed crystals on which the high-quartz mixed crystals grow.

The $ZrO_2$ content is preferably limited to less than 2% by weight since higher contents adversely affect the melting behaviour of the mix during glass production and the devitrification stability during shaping can be impaired by formation of Zr-containing crystals. The minimum content is 1.6% by weight in order to ensure sufficiently rapid formation of nuclei.

The component $TiO_2$ is a very effective constituent which is important for short ceramisation times. The $TiO_2$ content should be at least 2% by weight. Contents higher than 2.4% by weight are disadvantageous for the colour c* in transparent glass-ceramics having high-quartz mixed crystals as main crystal phase because of the formation of Fe/Ti and Sn/Ti colour complexes.

The component $SnO_2$ is limited to values of not more than 0.4% by weight, preferably not more than 0.3% by weight and particularly preferably not more than 0.2% by weight, in the interests of the devitrification resistance. Higher contents lead to crystallisation of Sn-containing crystal phases on the contact materials (e.g. Pt/Rh) during shaping and are to be avoided. Owing to the formation of Sn/Ti colour complexes, the content of $SnO_2$ should be very low, and the minimum amount needed is determined by the requirement for sufficient refining action or formation of nuclei.

To improve the fusibility and devitrification resistance, up to 1% by weight of $B_2O_3$ and 3% by weight of $P_2O_5$ can be present. Higher contents are disadvantageous for the chemical resistance and increase the thermal expansion. The component $B_2O_3$ is disadvantageous for the long-term stability heat resistance of the glass-ceramic and is preferably limited to a maximum of 0.5% by weight.

The starting glasses for the glass-ceramics according to the invention from the $Li_2O$—$Al_2O_3$—$SiO_2$ system can contain the usual chemical refining agents such as arsenic oxide, antimony oxide and/or cerium oxide. The refining agent $SnO_2$ can also be added as an alternative to or in combination with arsenic oxide, antimony oxide and/or cerium oxide in amounts of up to 0.4% by weight of $SnO_2$. Other refining additives such as manganese oxide, sulphate compounds, chloride compounds, fluoride compounds can be added to the glass melt. The total content of refining agents and refining additives should not exceed 2.4% by weight, preferably 2% by weight.

The water content of the glass-ceramics of the invention is, depending on the choice of mix raw materials and the process conditions during melting, preferably in the range from 0.015 mol/l to 0.06 mol/l. This corresponds to $\beta_{OH}$ values of from 0.16 mm$^{-1}$ to 0.64 mm$^{-1}$, measured on the crystallisable starting glasses.

In a further preferred embodiment, the glass-ceramic of the invention is characterized by a composition which consists essentially of (in % by weight on an oxide basis):

| | |
|---|---|
| $Li_2O$ | >4.0-4.5 |
| $Na_2O + K_2O$ | 0.05-0.3 |
| MgO | 0.2-0.8 |
| CaO + SrO | 0.1-0.8 |
| BaO | 0-0.3 |
| ZnO | 1.1-2.0 |
| $Al_2O_3$ | 19-23 |
| $SiO_2$ | 66-69 |
| $TiO_2$ | 2.0-2.4 |
| $ZrO_2$ | 1.6-<2.0 |
| $SnO_2$ | 0-0.2 |
| $P_2O_5$ | 0-1.5 |
| $B_2O_3$ | 0-0.5 |
| $As_2O_3$ | 0-1.0 | and optionally refining additives such as manganese oxide, sulphate compounds, chloride compounds, fluoride compounds in total contents of up to 1.0% by weight.

For the purposes of the present invention, "consists essentially of . . . " means that these components are present in an amount of at least 98% by weight in the glass-ceramic.

The use of cerium oxide and antimony oxide is preferably avoided since these bring about additional coloration in transparent glass-ceramics.

In order to achieve a further improvement in the properties which are critical for economical manufacture and the uses, the glass-ceramic has a particularly preferred composition (in % by weight on an oxide basis):

| | |
|---|---|
| $Li_2O$ | >4.0-4.3 |
| $Na_2O$ | 0.05-0.25 |
| $K_2O$ | 0-0.15 |
| $Na_2O + K_2O$ | 0.05-0.25 |
| MgO | 0.3-0.8 |
| CaO + SrO | 0.3-0.8 |
| BaO | 0-0.2 |
| ZnO | 1.3-1.9 |
| $Al_2O_3$ | 19-23 |
| $SiO_2$ | 66-69 |
| $TiO_2$ | 2.1-2.4 |
| $ZrO_2$ | 1.6-1.9 |
| $SnO_2$ | 0-<0.15 |
| $P_2O_5$ | <0.1 |
| $B_2O_3$ | 0-<0.1 |
| $As_2O_3$ | 0-0.9. |

The compositions according to the invention can be refined according to two different embodiments.

When a high optical quality, i.e. high light transmission and low colour, of the transparent glass-ceramic having high-quartz mixed crystals as main crystal phase is important, preference is given to using $As_2O_3$ as refining agent. The contents are then from 0.1% by weight to 1% by weight and preferably from 0.2% by weight to 0.9% by weight.

In a second embodiment, the LAS glass-ceramic has an environmentally friendly composition. For the purposes of the present invention, this means that the glass-ceramic is technically free of arsenic oxide and antimony oxide as conventional refining agents except for unavoidable impurities in raw materials. As impurity, these components are present in amounts of less than 1000 ppm, preferably less than 400 ppm.

In this embodiment, refining is carried out by addition of $SnO_2$ in amounts of from 0.05% by weight to 0.4% by weight. The upper limit is preferably 0.3% by weight and particularly preferably up to 0.2% by weight.

To reduce the colour, it is advantageous to use very small amounts of the refining agent $SnO_2$.

In this preferred embodiment, the glass-ceramic of the invention is preferably characterized by a composition which consists essentially of (in % by weight on an oxide basis):

| | |
|---|---|
| $Li_2O$ | >4.0-4.5 |
| $Na_2O + K_2O$ | 0.05-0.3 |
| MgO | 0.2-0.8 |
| CaO + SrO | 0.1-0.8 |
| BaO | 0-0.3 |
| ZnO | 1.1-2.0 |
| $Al_2O_3$ | 19-23 |
| $SiO_2$ | 66-69 |
| $TiO_2$ | 2.0-2.4 |
| $ZrO_2$ | 1.6-<2.0 |
| $SnO_2$ | 0.05-0.4 |
| $P_2O_5$ | 0-3 |
| $B_2O_3$ | 0-0.5 | and optionally refining additives such as cerium oxide, manganese oxide, sulphate compounds, chloride compounds, fluoride compounds in total contents of up to 1.0% by weight.

For the purposes of the present invention "consists essentially of . . . " means that these components are present in amounts of up to 98% by weight in the glass-ceramic.

In order to achieve a sufficient refining effect at the bubble qualities and tank throughputs required, it is advantageous to carry out a high-temperature refining operation at above 1700° C., preferably above 1750° C. The required bubble quality of less than 2 bubbles/kg in the glass or in the glass-ceramic (measured for bubble sizes of greater than 0.1 mm in one dimension) is achieved.

The alkali metal oxides $Na_2O$ and $K_2O$ improve the fusibility and the devitrification resistance during shaping of the glass. However, the contents have to be limited because these components are not incorporated into the crystal phase but instead remain in the residual glass phase of the glass-ceramic. The sum of these alkalis is therefore preferably less than 0.2% by weight.

The MgO content is preferably at least 0.4% by weight and is particularly preferably greater than 0.4% by weight and is up to 0.8% by weight, because this allows good fusibility to be combined with ability to set a low coefficient of thermal expansion.

The glass-ceramic preferably contains less than 0.1% by weight of BaO and is particularly preferably technically free except for unavoidable traces of usually less than 500 ppm.

The alkali metal oxides $Na_2O$ and $K_2O$ and the alkaline earth metal oxides CaO, SrO and BaO cannot be incorporated into the high-quartz and keatite mixed crystal phase and remain in the residual glass phase. They are critical for economical manufacturing conditions such as fusibility and devitrification resistance. The components CaO and SrO are more advantageous for the mechanical and thermal properties and also a low density. They assist the formation of high crystallinity and allow relatively low coefficients of thermal expansion of the glass-ceramics to be achieved.

It is therefore advantageous for the ratio of the total contents in % by weight of CaO+SrO to that of $Na_2O+K_2O+BaO$ to be greater than 1, and preference is given to this ratio of the total contents of the components to one another being greater than 2.

The CaO content is preferably from 0.2% by weight to 0.6% by weight. The additives are advantageous for the fusibility and the devitrification resistance and for a low density.

The SrO content is preferably from 0.05% by weight to 0.3% by weight. Since this element increases the density of the glass-ceramic to a greater extent than CaO at a comparable effect, the content of SrO in % by weight is preferably lower than that of CaO in % by weight, so that SrO/CaO is then <1.

The alkali metal oxides $Na_2O$, $K_2O$ and the alkaline earth metal oxides CaO, SrO, BaO accumulate not only in the residual glass phase between the crystals but also on the surface of the glass-ceramic. During ceramisation, a vitreous surface layer which has a thickness of from about 100 nm to 800 nm and is virtually free of crystals and is enriched in these elements at the expense of $Li_2O$ is formed. This vitreous surface layer has a favourable effect on the chemical resistance of the glass-ceramic. For this reason, the total content of the components $Na_2O$, $K_2O$, CaO, SrO and BaO should preferably be in the range from 0.5% by weight to 0.9% by weight. Higher total contents are disadvantageous in terms of achieving a low residual glass phase content.

Owing to the high costs of low-iron mix raw materials, it is uneconomical to limit the $Fe_2O_3$ content of the glass-ceramic to values of 0.008% by weight (80 ppm) and below. Since introduction of iron takes place via the comminution operation during recycling of glass fragments too, an Fe/Ti content of greater than 0.011% by weight is economically advantageous. Moreover, the concentration of the $Fe_2O_3$ colour complexes also increases with the $Fe_2O_3$ content of the transparent glass-ceramic. The coloration (chroma c*) is increased, and the light transmission Y (brightness) is reduced by absorption. The glass-ceramic should therefore contain not more than 0.02% by weight, preferably up to 0.016% by weight, of $Fe_2O_3$.

Especially in the case of transparent embodiments of the glass-ceramic, additions of $Nd_2O_3$ can be used for decolourising intrinsic colour present. However, when a particularly high light transmission is important, this addition is omitted.

Thus, the glass-ceramic can contain additions of $Nd_2O_3$ in amounts of up to 0.08% by weight (800 ppm). The additive acts as physical decolourising agent and reduces the undesirable colour caused by Fe/Ti and Sn/Ti colour complexes, especially in the case of a transparent glass-ceramic.

The $Nd_2O_3$ content is preferably less than 50 ppm, and the glass-ceramic is particularly preferably technically free of additions of $Nd_2O_3$, in order to avoid the absorption due to $Nd_2O_3$ and thus achieve a high light transmission. The omission of $Nd_2O_3$ is preferably combined with particularly low iron contents, namely not more than 0.016% by weight of $Fe_2O_3$.

In a further embodiment, the glass-ceramic is coloured by addition of colouring oxides such as $V_2O_5$, CoO, NiO, $Fe_2O_3$, $Cr_2O_3$, $MnO_2$, $CeO_2$, either individually or in combination. In this way, the transmission profile is matched to the requirements of the application. The amounts are preferably less than 1% by weight, both individually and in total. Additions of CoO, $Fe_2O_3$, NiO are suitable for decreasing the infrared transmission.

In the case of the abovementioned composition ranges, it should be noted that the components specified make up at least 98% by weight, generally more than 99% by weight, of the total composition. Many compounds of elements such as F, Cl, B, P, the alkali metals Rb, Cs or elements such as Mn, Hf are usual impurities in the mix raw materials used industrially. Other compounds such as those of the elements W, Nb, Y, Mo, Bi, the rare earths can likewise be present in small proportions.

In a first embodiment, the highly crystalline lithium aluminium silicate glass-ceramic contains high-quartz mixed crystals as main crystal phase. The average crystallite size is preferably less than 50 nm, and this preferred glass-ceramic is transparent without visually noticeable scattering.

The light transmission of the transparent LAS glass-ceramics measured in the CIE colour system as light transmission Y (brightness) is more than 82%, preferably more than 86% and particularly preferably at least 88%. The values are measured using standard light C, observation angle 2° for a 4 mm thick polished glass-ceramic specimen. The colour c*, measured in the CIELAB colour system, is below 9, preferably less than 5, more preferably less than 4 and particularly preferably less than 3.5, measured at a thickness of 4 mm using standard light C and an observation angle of 2°. The LAS glass-ceramic is preferably without visually undesirable light scattering.

The thermal expansion, measured in the range from 20° C. to 700° C., is preferably set to negative values below $-0.4 \cdot 10^{-6}$/K, preferably less than $-0.6 \cdot 10^{-6}$/K, for this type of LAS glass-ceramic having high-quartz mixed crystals. This opens up additional uses in the athermalisation of optical components without use in the conventional applications being put at risk because the deviation from zero expansion is small.

In a second embodiment, the highly crystalline lithium aluminium silicate glass-ceramic contains keatite mixed crystals as main crystal phase. Owing to the larger average crystallite size of more than 120 nm, the glass-ceramic is translucent or opaque. The content of residual glass phase is preferably less than 5% by weight.

The thermal expansion, measured in the range from 20° C. to 700° C., is preferably set to very low values of less than 1, preferably less than $0.9 \cdot 10^{-6}$/K, particularly preferably less than $0.8 \cdot 10^{-6}$/K, for this type of LAS glass-ceramic having keatite mixed crystals. A very low expansion can also be set in the temperature range around room temperature in the case of this type of glass-ceramic. In a preferred embodiment, the thermal expansion in the range from 25° C. to 50° C. is thus less than $0 \pm 0.3 \cdot 10^{-6}$/K, preferably less than $0 \pm 0.15 \cdot 10^{-6}$/K and more preferably less than $0 \pm 0.7 \cdot 10^{-6}$/K, for this type of LAS glass-ceramic having keatite mixed crystals.

The density of the glass-ceramic of the invention is preferably less than 2.54 g/cm$^3$.

The preferred geometry for the highly crystalline glass-ceramic of the invention or the articles produced therefrom is in the form of plates. The plate preferably has a thickness of from 2 mm to 20 mm, because this opens up important applications. At lower thicknesses, the strength is impaired, while higher thicknesses are less economical because of the greater materials requirement. Except for use as safety glass, in the case of which high strengths are important, the thickness is therefore generally selected below 6 mm.

Suitable shaping processes for the plate-like geometry are, in particular, rolling and floating.

The glass-ceramic plate and the articles preferably produced therefrom can not only be flat but can also be three-dimensionally moulded. For example, it is possible to use chamfered, angled or arched plates. The plates can be right-angled or have other shapes and can have not only flat regions but also three-dimensionally moulded regions, e.g. woks, or rolled-in webs or areas as elevated regions or depressions. The geometric moulding of the plates is carried out by hot forming, e.g. by means of structured shaping rollers, or by subsequent hot forming on the starting glasses, for example by means of burners or by dropping under gravity. Ceramisation is carried out using supporting ceramic moulds in order to avoid uncontrolled changes in the geometric shape.

Many applications are advantageously catered for by the favourable mechanical, optical and thermal properties associated with the high crystallinity, the low thermal expansion and the optimised microstructure made up of residual glass phase and crystallite phase.

The transparent, translucent or opaque, optionally coloured, glass-ceramic articles according to the invention having high-quartz or keatite mixed crystals as main crystal phase are employed as fire protection glass, chimney sight glass, oven window (in particular for pyrolysis ovens), cooking areas, optionally with underside coating, covering in the illumination sector and as safety glass, optionally in the form of laminate, as support plate or oven lining. In the ceramics, solar or pharmaceutical industry or medical technology, they are particularly suitable for production processes under high-purity conditions, as linings of ovens in which chemical or physical coating processes are carried out or as chemically resistant laboratory equipment. Furthermore, they are used as glass-ceramic article for high-temperature or extremely low-temperature applications, as furnace window for combustion furnaces, as heat shield for shielding hot environments, as covering for reflectors, floodlights, projectors, beamers, photocopiers, for uses subject to thermomechanical stress, for example in night vision appliances or as covering for heating elements, in particular as cooking or frying surface, as white ware, as heating element covering, as wafer substrate, as translucent article having UV protection, as wall tile or as construction constituent of an electronic appliance.

The transparent glass-ceramic plate having high-quartz mixed crystals as main crystal phase is likewise used in a transparent plate laminate for safety applications, for example against mechanical action (impact, storm) and bombardment with projectiles (munition, splinters). In the transparent plate laminate, at least one plate consists of the transparent glass-ceramic. The other plates can consist of soda-lime glass, borosilicate glass, aluminosilicate glass and/or plastic. The plates are joined to one another via polymer layers which have matched refractive indices and are composed of films or pourable resins as bonding agents in a lamination process. The thickness of the glass-ceramic plates is preferably more than 6 mm and particularly preferably more than 10 mm. Examples of organic bonding agents from the group consisting of pourable or reactive resins are those based on polyurethanes, polyvinyl butyral, polyureas, epoxides, polyesters, polybutylene terephthalates, poly(methyl) acrylates, silicones and silicone resin polymers. Examples from the group of thermoplastic adhesives are based on polyethylene or copolymers thereof, in particular ethylene-vinyl acetate, polyvinyl acetate and mixtures thereof.

The translucent or opaque glass-ceramic plate having keatite mixed crystals as main crystal phase is likewise used as precision component at room temperature, e.g. as spacer, photo mask, optical bench or wafer stages, as mirror support material for reflective optical components as in astronomy and in LCD or EUV lithography, or as laser gyroscope. It preferably has a coefficient of thermal expansion at from 25° C. to 50° C. of less than $0\pm0.3\cdot10^{-6}$/K. Its proportion of residual glass phase is preferably less than 5% by weight.

BRIEF DESCRIPTION OF THE DRAWINGS

The sole FIGURE is a graph illustrating a transmission curve of the glass ceramic in Example 23.

DETAILED DESCRIPTION

The present invention will be illustrated by the following examples.

The starting glasses were melted from raw materials customary in the glass industry at temperatures of about 1620° C. for 4 hours. After melting of the mix in crucibles made of sintered silica glass, the melts were poured into Pt/Rh crucibles having a crucible liner composed of silica glass and homogenised by stirring at temperatures of 1550° C. for 30 minutes. After this homogenisation, the glasses were refined at 1640° C. for 2 hours. Pieces having dimensions of about 140×140×30 mm$^3$ were subsequently cast and cooled in a cooling oven, commencing at 660° C., to room temperature. The castings were divided into the sizes required for the studies and for ceramisation.

Compositions and properties of the crystallisable starting glasses for the highly crystalline glass-ceramics are shown for some examples in TABLE 1. Here, the glasses 1 to 9 are glasses according to the invention and the glass 10 is a comparative glass having a composition outside the scope of the present invention.

Owing to typical impurities in the industrial mix raw material used, the compositions do not add up to precisely 100% by weight. Typical impurities, even if not introduced deliberately into the composition, are F, Cl, B, P, Mn, Rb, Cs, Hf which usually make up less than 0.1% by weight. They are often introduced via the raw materials for the related components, e.g. Rb and Cs via the Na or K raw materials, or Hf via the Zr raw materials.

The water content of selected starting glasses measured by means of IR spectroscopy is reported in TABLE 1.

TABLE 1 also shows properties in the vitreous state, namely the glass transition temperature Tg, the processing temperature $V_A$, melting temperature ("$10^2$ temperature") and density, for most of the glasses.

TABLE 2 shows the ceramisation conditions and properties of the glass-ceramics produced from the glasses 1 to 10 using the ceramisation program 1, and TABLE 3 shows the glass-ceramics produced from the same glasses using the ceramisation program 2.

TABLE 2 shows the variables in the ceramisation $T_{KB}$ and $T_{max}$ and also properties of the glass-ceramic, namely transmission values, thermal expansion in the range from 20° C. to 300° C. and also in the range from 20° C. to 700° C., density and the phase contents measured by means of X-ray diffraction and also the average crystallite size. The E-modulus or Young's modulus was also determined for selected glass-ceramics. The transmission measurements were carried out on polished plates having a thickness of 4 mm using standard light C, 2°. In the case of the measurements on the transparent glass-ceramics, the transmission values at selected wavelengths and also the light transmission are reported. The terms light transmission and brightness Y correspond to the same parameter measured in accordance with DIN 5033 in the CIE colour system. The Ra value (general colour reproduction index) is determined in accordance with DIN EN 410. The colour coordinates L* and the parameter c* as a measure of the colour from the CIELAB colour system are also given for measurements in transmitted light.

In the case of the ceramisation program 1, the glass is heated to a temperature of 600° C. in the ceramisation furnace in 20 minutes. The temperature range from 680° C. to 800° C. is important for nucleation. The temperature profile in this range is matched to the respective composition in such a way that light scattering due to excessively large crystallites is avoided. Above about 800° C., crystallisation of the desired high-quartz mixed crystal phase occurs. At the maximum temperature $T_{max}$, the composition of crystals and residual glass is set and the microstructure is homogenised. The chemical and physical properties are set as a result. In the case of the ceramisation program 1, a hold time $t_{KB}$ is introduced in the region of formation of nuclei at the temperature $T_{KB}$, the nucleation temperature. The maximum temperature $T_{max}$ is matched individually to the composition. The values $T_{max}$ and $T_{KB}$ are reported in TABLE 2. Properties of the glass-ceramics, namely the transmission at 400 nm, the infrared transmission at 1600 nm, the light transmission Y, the colour coordinate L* in the CIELAB system and the parameter c* as a measure of the colour, the thermal expansion and the density, are also shown in TABLE 2. The crystallite sizes and phase contents, namely the residual glass phase content and the high-quartz mixed crystal phase content, likewise shown in TABLE 2 were determined by means of X-ray diffraction. The density change experienced by the glass-ceramics during thermal after-treatment (compaction) is determined as length change on 100 mm long bars. This was determined for selected examples as difference between the length in the starting state and after heat treatment at 700° C., 15 hours. A contraction is generally observed.

Ceramisation program 1: rapid heating from room temperature to 600° C. in 20 minutes, increasing the temperature from 600° C. to the nucleation temperature $T_{KB}$ at a heating rate of 5 K/min, hold time $t_{KB}$ of 30 minutes at $T_{KB}$, increasing the temperature from $T_{KB}$ to the maximum temperature $T_{max}$ at a heating rate of 2.5 K/min, hold time $t_{max}$ of 10 minutes at $T_{max}$, cooling to 700° C. at 6 K/min, then rapid cooling to room temperature.

The glass-ceramics according to the invention having keatite mixed crystals as main crystal phase are produced using the ceramisation program 2. The program is based on the ceramisation program 1. The hold time $t_{KB}$ at nucleation in program step b) is varied, and in some cases no hold time is employed. In program step c), higher heating rates are used in some cases and the maximum temperature $T_{max}$ and the hold time $t_{max}$ are adapted (see TABLE 3). In particular, the maximum temperature is increased.

Ceramisation program 2: rapid heating from room temperature to 600° C. in 20 minutes, increasing the temperature from 600° C. to the nucleation temperature $T_{KB}$ at a heating rate of 5 K/min, hold time $t_{KB}$ at $T_{KB}$, increasing the temperature from $T_{KB}$ to the maximum temperature $T_{max}$ at a heating rate of from 2 to 30 K/min, hold time $t_{max}$, cooling to 700° C. at 6 K/min, then rapid cooling to room temperature.

The variables for nucleation $T_{KB}$, $t_{KB}$, the heating rate (from $T_{KB}$ to $T_{max}$), $T_{max}$ and $t_{max}$ and also the properties of the glass-ceramics, namely the infrared transmission at 1600 nm, the light transmission Y, the thermal expansion and the density, are shown for the ceramisation program 2 in TABLE 3. For measurements in reflected light (remission), the colour coordinates L*, a*, b* in the CIELAB system and the parameter c* as a measure of the colour are reported. The crystallite sizes shown in the TABLE and the phase contents were determined by means of X-ray diffraction. In the case of the glass-ceramics according to the invention in TABLE 3, the contents of residual glass phase are less than 5% by weight and the proportions of keatite mixed crystals and nucleating agent crystals are more than 95% by weight.

Example 10 in TABLE 2 is a comparative glass-ceramic which is outside the scope of the invention and was produced from the crystallisable comparative glass indicated. Comparative example 10 shows the disadvantage of relatively high proportions of residual glass phase and relatively high density. The compaction was found to be −11 μm/100 mm. This means that the 100 mm long glass-ceramic bar k contracted by 11 μm. The examples according to the invention which were measured display lower absolute values, namely: −8 μm (Example 2), −9 μm (Example 7), −6 μm (Example 9) and −5 μm (Example 8). In particular, the examples refined by means of $SnO_2$ without $As_2O_3$ have advantageously low absolute values.

In the case of some glass-ceramics having keatite mixed crystals as main crystal phase, the thermal expansions in the range from the room temperature of 25° C. to 50° C. were also measured. These were found to be −0.3•10⁻⁶/K (Example 16), −0.2•10⁻⁶/K (Example 19) and −0.1•10⁻⁶/K (Example 20).

The advantageously low absolute values of the compaction of the glass-ceramics according to the invention are also found after conversion into glass-ceramics having keatite mixed crystals as main crystal phase. Thus, the examples selected for the measurement give values of −1 μm (Examples 21 and 22), −3 μm (Examples 12 and 13). The comparative glass 10, converted using a program as in Example 19, has a compaction of −5 μm.

In an additional Example No. 23, a composition comprising 4.09% by weight of $Li_2O$, 0.11% by weight of $Na_2O$, 0.06% by weight of $K_2O$, 0.63% by weight of MgO, 0.44% by weight of CaO, 0.10% by weight of SrO, 0.05% by weight of BaO, 1.68% by weight of ZnO, 21.0% by weight of $Al_2O_3$, 67.3% by weight of $SiO_2$, 2.23% by weight of $TiO_2$, 1.75% by weight of $ZrO_2$, 0.60% by weight of $As_2O_3$ and 29 ppm of $Nd_2O_3$ was melted on an industrial scale. In order to obtain low $Fe_2O_3$ contents measured as 0.014% by weight, which are advantageous for transparent glass-ceramics, comparatively pure industrial mix raw materials, i.e. lithium carbonate, $SiO_2$ sand and aluminium oxide, were used. Owing to their influence on the properties such as the transmission, the impurity contents of the molten glass which are typical for this raw materials basis were analysed for some elements. Contents of 0.027% by weight of $P_2O_5$, 0.01% by weight of $B_2O_3$, 50 ppm of F, 50 ppm of Cl, 10 ppm of $SnO_2$, 3 ppm of $Cr_2O_3$, 2 ppm of CuO, 2 ppm of $V_2O_5$, 4 ppm of $MnO_2$, 1 ppm of NiO, 1 ppm of $Sb_2O_3$, ≤1 ppm of CoO, ≤1 ppm of $MoO_3$ were found. The composition is optimised in respect of the requirements for economical production and high crystallinity of the glass-ceramics. The water content was found to be 0.036 mol/l. This corresponds to a water content $\beta_{OH}$ of 0.38 mm$^{-1}$ measured on the crystallisable glass. The glass composition of Example No. 23 is characterized by food fusibility (low 10$^2$ temperature of 1757° C.), low processing temperature V$_A$ of 1312° C. and good devitrification resistance. A feature indicating the devitrification resistance is the difference between processing temperature V$_A$ and upper devitrification limit DVL. It is 37 K here. The density of the crystallisable glass is 2.438 g/cm$^3$. The glass melt was refined at high temperatures of about 1800° C. for 15 minutes. The bubble quality of this glass was excellent and was <2 bubbles/kg of glass. In the shaping operation, a glass strip which was smooth on both sides and had a thickness of 13 mm was rolled and cooled in a cooling oven to avoid stress. Plates having a size of 500 mm×500 mm×13 mm were cut from this glass strip and ceramicised on flat ceramic underlay plates in a roller furnace. The ceramisation program 3 was adapted in respect of evenness to the geometry of the plates. Owing to the comparatively high plate thicknesses and temperature differences associated therewith in the plate, distortion can otherwise occur due to different crystallisation shrinkage over time.

Ceramisation program 3: rapid heating from room temperature to 650° C. in 6 minutes, increasing the temperature from 650° C. to the nucleation temperature of 735° C. in 14 minutes, hold time $t_{KB}$ of 30 minutes, increasing the temperature from 735° C. to 790° C. in 75 minutes, increasing the temperature from 790° C. to the maximum temperature of 885° C. in 17 minutes, hold time $t_{max}$ of 10 minutes, cooling to 855° C. at 2 K/min, then rapid cooling to room temperature.

The resulting transparent glass-ceramic plates having high-quartz mixed crystals as predominant crystal phase had a very good evenness of less than 0.3% of the edge length. To determine the evenness, a straight-edge is laid diagonally across the horizontal plate, the maximum height deviation is determined and divided by the edge length.

The density of the glass-ceramic was 2.527 g/cm$^3$. The thermal expansion measured in the range from 25° C. to 700° C. was found to be −0.48•10$^{-6}$/K and that in the range from the room temperature of 25° C. to 300° C. was found to be −0.80•10$^{-6}$/K. The transmission curve of this glass-ceramic according to the invention is depicted in the FIGURE. The transparency corresponds to the advantageous values according to the invention with a light transmission Y of 89.5%, coloration c* of 3.2, L* of 95.8, transmission of 76.7% at 400 nm, transmission of 89.9% at 1600 nm and no visually undesirable scattering. The measurement was carried out using standard light C on 4 mm thick plates which had been polished on both sides.

By means of X-ray diffraction, the phase content of high-quartz mixed crystals was found to be 83%, the proportion of nucleating agent crystals was found to be 3% and the proportion of residual glass phase was found to be 14%. No keatite mixed crystals were detected, and the average crystallite size was 39 nm. The Young's modulus was found to be 95 GPa.

The starting glasses for the glass-ceramics have low melting and shaping temperatures and can be produced from inexpensive mix raw materials. They display a high devitrification resistance.

They can be converted into glass-ceramics in short ceramisation times.

The glass-ceramics thus have economical manufacturing properties.

The glass-ceramics satisfy the requirements of various applications, e.g. chemical resistance, mechanical strength, transmission, heat resistance and long-term stability in respect of changes in their properties (e.g. thermal expansion, transmission, build-up of stresses). In many applications in which a low weight of the article is important, their low density is advantageous.

A particularly advantageous aspect of the invention is that a transparent glass-ceramic having high-quartz mixed crystals as main crystal phase or a translucent or opaque glass-ceramic having keatite mixed crystals as main crystal phase can be produced from one and the same composition of the crystallisable lithium aluminium silicate glass, depending on the ceramisation conditions selected.

TABLE 1

Compositions and properties of starting glasses according to the invention and comparative glass 10

| | | Glass No. | | | |
|---|---|---|---|---|---|
| | | 1 | 2 | 3 | 4 |
| Composition | | | | | |
| Li$_2$O | [% by weight] | 4.11 | 4.13 | 4.13 | 4.57 |
| Na$_2$O | | 0.11 | | 0.13 | |
| K$_2$O | | 0.05 | | | 0.06 |
| MgO | | 0.58 | 0.48 | 0.66 | 0.56 |
| CaO | | 0.46 | 0.50 | 0.28 | 0.46 |
| SrO | | 0.09 | 0.03 | | 0.09 |
| BaO | | 0.05 | | | |
| ZnO | | 1.65 | 1.63 | 1.47 | 1.55 |
| Al$_2$O$_3$ | | 21.00 | 20.90 | 20.80 | 21.60 |
| SiO$_2$ | | 67.30 | 67.80 | 67.80 | 66.50 |
| P$_2$O$_5$ | | 0.03 | | | 0.03 |
| TiO$_2$ | | 2.26 | 2.21 | 2.30 | 2.25 |
| ZrO$_2$ | | 1.74 | 1.69 | 1.70 | 1.68 |
| SnO$_2$ | | | | | |
| Fe$_2$O$_3$ | | 0.014 | 0.014 | 0.014 | 0.017 |
| Nd$_2$O$_3$ | | | | | |
| As$_2$O$_3$ | | 0.54 | 0.56 | 0.66 | 0.60 |
| H$_2$O | [mol/l] | 0.031 | 0.034 | 0.031 | 0.032 |
| (CaO + SrO)/(Na$_2$O + K$_2$O + BaO) | | 2.62 | >100 | 2.15 | 9.17 |
| Properties, vitreous | | | | | |
| Glass transition temperature Tg | [° C.] | 678 | 686 | 684 | 676 |
| Melting temperature T(10$^2$ dPas) | [° C.] | 1752 | 1768 | 1760 | 1726 |
| Processing temperature VA | [° C.] | 1308 | 1317 | 1313 | 1290 |
| Density | [g/cm$^3$] | 2.439 | 2.432 | 2.432 | 2.442 |

| | | Glass No. | | |
|---|---|---|---|---|
| | | 5 | 6 | 7 |
| Composition | | | | |
| Li$_2$O | [% by weight] | 4.37 | 4.19 | 4.19 |
| Na$_2$O | | 0.10 | 0.08 | 0.11 |
| K$_2$O | | 0.06 | 0.06 | 0.08 |
| MgO | | 0.20 | 0.46 | 0.52 |
| CaO | | 0.47 | 0.23 | 0.15 |
| SrO | | 0.09 | 0.16 | 0.20 |
| BaO | | | 0.48 | 0.25 |
| ZnO | | 1.49 | 1.65 | 1.64 |
| Al$_2$O$_3$ | | 21.10 | 20.60 | 20.60 |
| SiO$_2$ | | 67.50 | 67.40 | 67.60 |
| P$_2$O$_5$ | | | 0.02 | |
| TiO$_2$ | | 2.26 | 2.29 | 2.27 |
| ZrO$_2$ | | 1.71 | 1.84 | 1.85 |
| SnO$_2$ | | | | |
| Fe$_2$O$_3$ | | 0.017 | 0.012 | 0.013 |
| Nd$_2$O$_3$ | | | 0.009 | |
| As$_2$O$_3$ | | 0.60 | 0.50 | 0.51 |
| H$_2$O | [mol/l] | 0.032 | 0.037 | 0.036 |
| (CaO + SrO)/(Na$_2$O + K$_2$O + BaO) | | 3.50 | 0.63 | 0.80 |

TABLE 1-continued

Compositions and properties of starting glasses according to the invention and comparative glass 10

Properties, vitreous

| | | | | |
|---|---|---|---|---|
| Glass transition temperature Tg | [° C.] | 676 | 669 | not measured |
| Melting temperature T($10^2$ dPas) | [° C.] | 1762 | not measured | not measured |
| Processing temperature VA | [° C.] | 1320 | not measured | not measured |
| Density | [g/cm³] | 2.432 | 2.443 | 2.441 |

| | | Glass No. | | |
|---|---|---|---|---|
| | | 8 | 9 | 10 |

Composition

| | | 8 | 9 | 10 |
|---|---|---|---|---|
| Li₂O | [% by weight] | 4.10 | 4.21 | 3.73 |
| Na₂O | | 0.11 | 0.10 | 0.47 |
| K₂O | | 0.05 | 0.08 | |
| MgO | | 0.57 | 0.49 | 0.56 |
| CaO | | 0.47 | 0.14 | |
| SrO | | 0.09 | 0.20 | |
| BaO | | | 0.25 | 1.91 |
| ZnO | | 1.65 | 1.73 | 1.63 |
| Al₂O₃ | | 20.60 | 20.70 | 21.60 |
| SiO₂ | | 67.90 | 67.60 | 65.20 |
| P₂O₅ | | 0.02 | 0.02 | |
| TiO₂ | | 2.26 | 2.29 | 2.38 |
| ZrO₂ | | 1.85 | 1.82 | 1.78 |
| SnO₂ | | 0.21 | 0.21 | |
| Fe₂O₃ | | 0.018 | 0.018 | 0.014 |
| Nd₂O₃ | | 0.06 | 0.06 | |
| As₂O₃ | | | | 0.70 |
| H₂O | [mol/l] | 0.040 | 0.039 | 0.030 |
| (CaO + SrO)/(Na₂O + K₂O + BaO) | | 3.50 | 0.79 | 0.00 |

Properties vitreous

| | | | | |
|---|---|---|---|---|
| Glass transition temperature Tg | [° C.] | not measured | not measured | 685 |
| Melting temperature T($10^2$ dPas) | [° C.] | not measured | not measured | 1741 |
| Processing temperature VA | [° C.] | not measured | not measured | 1307 |
| Density | [g/cm³] | 2.439 | 2.441 | 2.476 |

TABLE 2

Properties of glass-ceramics according to the invention and comparative glass-ceramic 10 (ceramisation program 1)

| | | Example No. | | |
|---|---|---|---|---|
| | | 1 | 2 | 3 |
| | | Glass No. | | |
| | | 1 | 2 | 3 |

Ceramisation program 1

| | | 1 | 2 | 3 |
|---|---|---|---|---|
| Nucleation temperature TKB | [° C.] | 735 | 730 | 730 |
| Maximum temperature Tmax | [° C.] | 888 | 894 | 891 |

Properties, ceramicised
Transmission using standard light C, 2°, 4 mm thickness

| | | 1 | 2 | 3 |
|---|---|---|---|---|
| 400 nm | [%] | 76.7 | 77.2 | 75.6 |
| 1600 nm | [%] | 89.4 | 89.1 | 89.2 |
| Light transmission Y | [%] | 89.0 | 88.9 | 89.0 |
| L* | | 95.6 | 95.5 | 95.6 |
| c* | | 3.1 | 3.0 | 3.3 |
| Ra (colour reproduction index) | [%] | 98.2 | 98.3 | 98.2 |

Thermal expansion

| | | 1 | 2 | 3 |
|---|---|---|---|---|
| α₂₀/₃₀₀ | [$10^{-6}$/K] | −0.85 | −0.98 | −0.85 |
| α₂₀/₇₀₀ | [$10^{-6}$/K] | −0.51 | −0.68 | −0.51 |
| Density | [g/cm³] | 2.529 | 2.526 | 2.529 |

X-ray diffraction

| | | 1 | 2 | 3 |
|---|---|---|---|---|
| High-quartz mixed crystal phase content | [%] | 80 | 82 | 81 |
| Crystallite size | [nm] | 31 | 34 | 32 |
| Residual glass phase content | [%] | 17 | 15 | 16 |
| Young's modulus | [GPa] | 95 | 95 | 95 |

| | | Example No. | | |
|---|---|---|---|---|
| | | 4 | 5 | 6 |
| | | Glass No. | | |
| | | 4 | 5 | 6 |

Ceramisation program 1

| | | 4 | 5 | 6 |
|---|---|---|---|---|
| Nucleation temperature TKB | [° C.] | 720 | 730 | 740 |
| Maximum temperature Tmax | [° C.] | 878 | 894 | 888 |

Properties, ceramicised
Transmission using standard light C, 2°, 4 mm thickness

| | | 4 | 5 | 6 |
|---|---|---|---|---|
| 400 nm | [%] | 71.4 | 76.0 | 75.3 |
| 1600 nm | [%] | 89.0 | 88.9 | 89.5 |
| Light transmission Y | [%] | 88.1 | 88.8 | 88.5 |
| L* | | 95.2 | 95.5 | 95.4 |
| c* | | 4.1 | 3.3 | 3.4 |
| Ra (colour reproduction index) | [%] | 97.6 | 98.1 | 97.9 |

Thermal expansion

| | | 4 | 5 | 6 |
|---|---|---|---|---|
| α₂₀/₃₀₀ | [$10^{-6}$/K] | −0.89 | −1.25 | −0.93 |
| α₂₀/₇₀₀ | [$10^{-6}$/K] | −0.52 | −0.87 | −0.61 |
| Density | [g/cm³] | 2.520 | 2.524 | 2.531 |

X-ray diffraction

| | | 4 | 5 | 6 |
|---|---|---|---|---|
| High-quartz mixed crystal phase content | [%] | 81 | 81 | 79 |
| Crystallite size | [nm] | 30 | 32 | 32 |
| Residual glass phase content | [%] | 16 | 16 | 18 |
| Young's modulus | [GPa] | 96 | 95 | not measured |

| | | Example No. | |
|---|---|---|---|
| | | 7 | 8 |
| | | Glass No. | |
| | | 7 | 8 |

Ceramisation program 1

| | | 7 | 8 |
|---|---|---|---|
| Nucleation temperature TKB | [° C.] | 745 | 745 |
| Maximum temperature Tmax | [° C.] | 885 | 887 |

Properties, ceramicised
Transmission using standard light C, 2°, 4 mm thickness

| | | 7 | 8 |
|---|---|---|---|
| 400 nm | [%] | 75.6 | 47.5 |
| 1600 nm | [%] | 89.5 | 88.0 |
| Light transmission Y | [%] | 88.7 | 82.7 |
| L* | | 95.5 | 92.9 |
| c* | | 3.5 | 7.6 |
| Ra (colour reproduction index) | [%] | 98.0 | 95.3 |

TABLE 2-continued

Properties of glass-ceramics according to the invention and comparative glass-ceramic 10 (ceramisation program 1)

Thermal expansion

| | | | |
|---|---|---|---|
| $\alpha_{20/300}$ | [$10^{-6}$/K] | −0.88 | −0.80 |
| $\alpha_{20/700}$ | [$10^{-6}$/K] | −0.57 | −0.51 |
| Density | [g/cm$^3$] | 2.527 | 2.526 |
| X-ray diffraction | | | |
| High-quartz mixed crystal phase content | [%] | 80 | 78 |
| Crystallite size | [nm] | 31 | 32 |
| Residual glass phase content | [%] | 17 | 19 |
| Young's modulus | [GPa] | not measured | not measured |

| | Example No. | |
|---|---|---|
| | 9 | 10 |
| | Glass No. | |
| | 9 | 10 |
| Ceramisation program 1 | | |
| Nucleation temperature TKB [° C.] | 740 | 743 |
| Maximum temperature Tmax [° C.] | 890 | 892 |

TABLE 2-continued

Properties of glass-ceramics according to the invention and comparative glass-ceramic 10 (ceramisation program 1)

Properties, ceramicised
Transmission using standard light C,
2°, 4 mm thickness

| | | | |
|---|---|---|---|
| 400 nm | [%] | 45.8 | 78.8 |
| 1600 nm | [%] | 88.1 | 89.3 |
| Light transmission Y | [%] | 83.0 | 89.1 |
| L* | | 93.0 | 95.6 |
| c* | | 8.0 | 2.8 |
| Ra (colour reproduction index) | [%] | 95.6 | 95.5 |
| Thermal expansion | | | |
| $\alpha_{20/300}$ | [$10^{-6}$/K] | −0.97 | −0.45 |
| $\alpha_{20/700}$ | [$10^{-6}$/K] | −0.59 | −0.12 |
| Density | [g/cm$^3$] | 2.525 | 2.553 |
| X-ray diffraction | | | |
| High-quartz mixed crystal phase content | [%] | 78 | 71 |
| Crystallite size | [nm] | 30 | 36 |
| Residual glass phase content | [%] | 19 | 26 |
| Young's modulus | [GPa] | not measured | 94 |

TABLE 3

Properties of glass-ceramics according to the invention (ceramisation program 2)

| | | Example No. | | | |
|---|---|---|---|---|---|
| | | 11 | 12 | 13 | 14 |
| | | Glass No. | | | |
| | | 1 | 2 | 2 | 3 |
| Ceramisation program 2 | | | | | |
| Nucleation temperature TKB | [° C.] | 735 | 730 | 730 | 730 |
| Hold time at tKB | [min] | 0 | 15 | 15 | 15 |
| Heating rate to Tmax | [° C./min] | 20 | 6 | 6 | 6 |
| Maximum temperature Tmax | [° C.] | 1080 | 1060 | 1150 | 1150 |
| Hold time at tmax | [min] | 15 | 15 | 60 | 60 |
| Properties, ceramicised Transmission using standard light C, 2°, 4 mm thickness | | | | | |
| 1600 nm | [%] | 63.33 | 80.34 | 10.32 | 10.06 |
| Light transmission Y | [%] | 3.7 | 8.1 | 0.2 | 0.1 |
| Remission using standard light C, 2°, 4 mm thickness | | | | | |
| L* | | 90.3 | 84.5 | 95.4 | 95.3 |
| a* | | −1.4 | −3.6 | −0.2 | −0.4 |
| b* | | 1.5 | −2.6 | 3.6 | 3.9 |
| c* | | 2.0 | 4.4 | 3.6 | 3.9 |
| Thermal expansion | | | | | |
| $\alpha_{20/300}$ | [$10^{-6}$/K] | 0.88 | 0.25 | 0.25 | 0.29 |
| $\alpha_{20/700}$ | [$10^{-6}$/K] | 1.14 | 0.68 | 0.70 | 0.72 |
| Density | [g/cm$^3$] | 2.5097 | 2.5151 | 2.5178 | 2.5127 |
| X-ray diffraction | | | | | |
| Crystallite size | [nm] | 131 | 147 | 147 | 153 |

TABLE 3-continued

Properties of glass-ceramics according to the invention (ceramisation program 2)

| | | Example No. 15 | Example No. 16 | Example No. 17 |
|---|---|---|---|---|
| | | Glass No. 4 | Glass No. 5 | Glass No. 6 |
| Ceramisation program 2 | | | | |
| Nucleation temperature TKB | [° C.] | 725 | 735 | 745 |
| Hold time at tKB | [min] | 5 | 0 | 15 |
| Heating rate to Tmax | [° C./min] | 25 | 20 | 6 |
| Maximum temperature Tmax | [° C.] | 1170 | 1080 | 1050 |
| Hold time at tmax | [min] | 30 | 15 | 15 |
| Properties, ceramicised Transmission using standard light C, 2°, 4 mm thickness | | | | |
| 1600 nm | [%] | 5.05 | 70.82 | 82.02 |
| Light transmission Y | [%] | 0.1 | 3.6 | 10.5 |
| Remission using standard light C, 2°, 4 mm thickness | | | | |
| L* | | 95.9 | 89.7 | 73.5 |
| a* | | −0.4 | −1.5 | −3.2 |
| b* | | 4.1 | 1.2 | −11.5 |
| c* | | 4.1 | 1.9 | 12.0 |
| Thermal expansion | | | | |
| $\alpha_{20/300}$ | [$10^{-6}$/K] | not measured | 0.11 | 0.18 |
| $\alpha_{20/700}$ | [$10^{-6}$/K] | not measured | 0.61 | 0.65 |
| Density | [g/cm$^3$] | 2.5008 | 2.5074 | 2.5133 |
| X-ray diffraction | | | | |
| Crystallite size | [nm] | 157 | 141 | 137 |

| | | Example No. 18 | Example No. 19 | Example No. 20 |
|---|---|---|---|---|
| | | Glass No. 7 | Glass No. 8 | Glass No. 8 |
| Ceramisation program 2 | | | | |
| Nucleation temperature TKB | [° C.] | 745 | 745 | 745 |
| Hold time at tKB | [min] | 0 | 15 | 10 |
| Heating rate to Tmax | [° C./min] | 25 | 6 | 25 |
| Maximum temperature Tmax | [° C.] | 1190 | 1050 | 1190 |
| Hold time at tmax | [min] | 25 | 15 | 25 |
| Properties, ceramicised Transmission using standard light C, 2°, 4 mm thickness | | | | |
| 1600 nm | [%] | 6.34 | 84.44 | 7.05 |
| Light transmission Y | [%] | 0.1 | 23.8 | 0.0 |
| Remission using standard light C, 2°, 4 mm thickness | | | | |
| L* | | 91.9 | 55.9 | 92.4 |
| a* | | −0.3 | −5.8 | −0.2 |
| b* | | 3.7 | −4.1 | 1.7 |
| c* | | 3.7 | 7.1 | 1.7 |

TABLE 3-continued

Properties of glass-ceramics according to the invention (ceramisation program 2)

| Thermal expansion | | | | |
|---|---|---|---|---|
| $\alpha_{20/300}$ | [$10^{-6}$/K] | 0.06 | 0.24 | 0.26 |
| $\alpha_{20/700}$ | [$10^{-6}$/K] | 0.56 | 0.67 | 0.67 |
| Density | [g/cm$^3$] | 2.5093 | 2.5046 | 2.5077 |
| X-ray diffraction | | | | |
| Crystallite size | [nm] | 141 | 138 | 160 |

| | | Example No. | |
|---|---|---|---|
| | | 21 | 22 |
| | | Glass No. | |
| | | 9 | 9 |
| Ceramisation program 2 | | | |
| Nucleation temperature TKB | [° C.] | 735 | 745 |
| Hold time at tKB | [min] | 0 | 0 |
| Heating rate to Tmax | [° C./min] | 20 | 25 |
| Maximum temperature Tmax | [° C.] | 1080 | 1190 |
| Hold time at tmax | [min] | 15 | 25 |
| Properties, ceramicised | | | |
| Transmission using standard light C, 2°, 4 mm thickness | | | |
| 1600 nm | [%] | 76.86 | 10.39 |
| Light transmission Y | [%] | 9.7 | 0.0 |
| Remission using standard light C, 2°, 4 mm thickness | | | |
| L* | | 63.9 | 92.2 |
| a* | | −3.8 | −0.4 |
| b* | | −3.9 | 2.2 |
| c* | | 5.4 | 2.3 |
| Thermal expansion | | | |
| $\alpha_{20/300}$ | [$10^{-6}$/K] | 0.15 | 0.15 |
| $\alpha_{20/700}$ | [$10^{-6}$/K] | 0.62 | 0.61 |
| Density | [g/cm$^3$] | 2.5076 | 2.5105 |
| X-ray diffraction | | | |
| Crystallite size | [nm] | 138 | 141 |

What is claimed is:

1. A highly crystalline lithium aluminium silicate glass-ceramic, comprising a proportion of residual glass phase of less than 20% by weight and components in % by weight on an oxide basis:

| | |
|---|---|
| $Li_2O$ | >4.0-4.6; |
| $Na_2O + K_2O$ | 0-<0.4; |
| MgO | 0.2-0.8; |
| CaO + SrO | 0.05-1.0; |
| BaO | 0-<0.5; |
| ZnO | 1.0-2.0; |
| $Al_2O_3$ | 19-23; |
| $SiO_2$ | 66-<70; |
| $TiO_2$ | 2.0-2.4; |
| $ZrO_2$ | 1.6-<2.0; |
| $SnO_2$ | 0-0.4; |
| $P_2O_5$ | 0-3; and |
| $B_2O_3$ | 0-1.0, | wherein the highly crystalline lithium aluminium silicate glass-ceramic is a transparent glass-ceramic having high-quartz mixed crystals as main crystal phase, and wherein the highly crystalline lithium aluminium silicate glass-ceramic, when in the form of the transparent glass-ceramic, has a phase content of the high-quartz mixed crystals of between 78 to 83%, and wherein the highly crystalline lithium aluminium silicate glass-ceramic is free of additions of $Nd_2O_3$.

2. The lithium aluminium silicate glass-ceramic according to claim 1, further comprising chemical refining agents or additives selected from the group consisting of $As_2O_3$, $Sb_2O_3$, $CeO_2$, manganese oxide, sulphate compounds, chloride compounds, fluoride compounds, and any combinations thereof.

3. The lithium aluminium silicate glass-ceramic according to claim 1, wherein the composition consists essentially of (in % by weight on an oxide basis):

| | |
|---|---|
| Li$_2$O | >4.0-4.5; |
| Na$_2$O + K$_2$O | 0.05-0.3; |
| MgO | 0.2-0.8; |
| CaO + SrO | 0.1-0.8; |
| BaO | 0-0.3; |
| ZnO | 1.1-2.0; |
| Al$_2$O$_3$ | 19-23; |
| SiO$_2$ | 66-69; |
| TiO$_2$ | 2.0-2.4; |
| ZrO$_2$ | 1.6-<2.0; |
| SnO$_2$ | 0-0.2; |
| P$_2$O$_5$ | 0-1.5; |
| B$_2$O$_3$ | 0-0.5; and |
| As$_2$O$_3$ | 0-1.0. |

4. The lithium aluminium silicate glass-ceramic according to claim 3, further comprising refining additives, in total contents of up to 1.0% by weight, selected from the group consisting of manganese oxide, sulphate compounds, chloride compounds, fluoride compounds.

5. The lithium aluminium silicate glass-ceramic according to claim 1, wherein the composition (in % by weight on an oxide basis) comprises:

| | |
|---|---|
| Li$_2$O | >4.0-4.3; |
| Na$_2$O | 0.05-0.25; |
| K$_2$O | 0-0.15; |
| Na$_2$O + K$_2$O | 0.05-0.25; |
| MgO | 0.3-0.8; |
| CaO + SrO | 0.3-0.8; |
| BaO | 0-0.2; |
| ZnO | 1.3-1.9; |
| Al$_2$O$_3$ | 19-23; |
| SiO$_2$ | 66-69; |
| TiO$_2$ | 2.1-2.4; |
| ZrO$_2$ | 1.6-1.9; |
| SnO$_2$ | 0 < 0.15; |
| P$_2$O$_5$ | <0.1; |
| B$_2$O$_3$ | 0 < 0.1; and |
| As$_2$O$_3$ | 0-0.9. |

6. The lithium aluminium silicate glass-ceramic according to claim 5, wherein the As$_2$O$_3$ content is 0.2-0.9% by weight.

7. The lithium aluminium silicate glass-ceramic according to claim 1, wherein the SnO$_2$ content is 0.05-0.4% by weight.

8. The lithium aluminium silicate glass-ceramic according to claim 1, wherein the composition is technically free of As$_2$O$_3$ and Sb$_2$O$_3$.

9. The lithium aluminium silicate glass-ceramic according to claim 1, wherein the composition comprises a sum of Na$_2$O+K$_2$O that is <0.2% by weight.

10. The lithium aluminium silicate glass-ceramic according to claim 1, wherein the MgO content is 0.4-0.8% by weight.

11. The lithium aluminium silicate glass-ceramic according to claim 1, wherein the BaO content is <0.1% by weight.

12. The lithium aluminium silicate glass-ceramic according to claim 1, wherein the composition comprises a ratio of the total contents in % by weight of (CaO+SrO)/(Na$_2$O+K$_2$O+BaO) of >1.

13. The lithium aluminium silicate glass-ceramic according to claim 1, wherein the composition comprises a sum of Na$_2$O, K$_2$O, CaO, SrO, and BaO that is in the range from 0.5% by weight to 0.9% by weight.

14. The lithium aluminium silicate glass-ceramic according to claim 1, further comprising an Fe$_2$O$_3$ content of from 0.008 to 0.02% by weight.

15. The lithium aluminium silicate glass-ceramic according to claim 1, wherein the transparent glass-ceramic is a transparent plate with a thickness of more than 6 mm.

16. The lithium aluminium silicate glass-ceramic according to claim 1, wherein the lithium aluminium silicate glass-ceramic is a glass-ceramic plate having a thickness of from 2 mm to 20 mm.

17. The lithium aluminium silicate glass-ceramic according to claim 1, wherein the lithium aluminium silicate glass-ceramic is suitable for a use selected from the group consisting of: fire protection glass, chimney sight glass, oven window glass, a cooking area, a cooking area with an underside coating, an illumination covering, safety glass, safety glass laminate, support plate, oven lining, combustion furnace window, heat shield, reflector covering, floodlight, projector, beamer, photocopier, night vision appliances, heating element covering, a cooking surface, a frying surface, white ware, heating element covering, wafer substrate, translucent article with UV protection, wall tile, electronic appliance, a spacer stage, a wafer stage, and a mirror support.

18. A method comprising:
providing a lithium aluminium silicate glass composition having in % by weight on an oxide basis:

| | |
|---|---|
| Li$_2$O | >4.0-4.6, |
| Na$_2$O + K$_2$O | 0-<0.4, |
| MgO | 0.2-0.8, |
| CaO + SrO | 0.05-1.0, |
| BaO | 0-<0.5, |
| ZnO | 1.0-2.0, |
| Al$_2$O$_3$ | 19-23, |
| SiO$_2$ | 66-<70, |
| TiO$_2$ | 2.0-2.4, |
| ZrO$_2$ | 1.6-<2.0, |
| SnO$_2$ | 0-0.4, |
| P$_2$O$_5$ | 0-3, and |
| B$_2$O$_3$ | 0-1.0; | melting, refining, and forming the composition into glass plates;
selecting either a first ceramisation condition to produce from the composition a transparent glass-ceramic having high-quartz mixed crystals as main crystal phase or a second ceramisation condition to produce from the composition a translucent or opaque glass-ceramic having keatite mixed crystals as main crystal phase; and
ceramicising at least some of the glass plates at the first ceramisation condition so that a proportion of residual glass phase is less than 20% by weight and ceramicising others of the glass plates at the second ceramisation condition so that a proportion of residual glass phase is less than 5% by weight.

19. A method comprising:
determining that a specific crystallisable starting glass composition comprises, once crystallized depending on a crystallization condition, either high-quartz mixed crystals as a main crystal phase or keatite mixed crystals as the main crystal phase, the specific crystallisable starting glass composition comprising in % by weight on an oxide basis:

| | |
|---|---|
| Li$_2$O | >4.0-4.6, |
| Na$_2$O + K$_2$O | 0-<0.4, |
| MgO | 0.2-0.8, |
| CaO + SrO | 0.05-1.0, |
| BaO | 0-<0.5, |
| ZnO | 1.0-2.0, |
| Al$_2$O$_3$ | 19-23, |
| SiO$_2$ | 66-<70, |
| TiO$_2$ | 2.0-2.4, |

-continued

| | |
|---|---|
| ZrO$_2$ | 1.6-<2.0, |
| SnO$_2$ | 0-0.4, |
| P$_2$O$_5$ | 0-3, and |
| B$_2$O$_3$ | 0-1.0; | providing the specific crystallisable starting glass composition;

melting, refining, and forming the specific crystallisable starting glass composition into glass plates;

selecting either a first ceramisation condition to produce from the specific crystallisable starting glass composition a transparent glass-ceramic having the high-quartz mixed crystals as the main crystal phase or a second ceramisation condition to produce from the specific crystallisable starting glass composition a translucent or opaque glass-ceramic having the keatite mixed crystals as the main crystal phase; and ceramicising the at least some of the glass plates at the first ceramisation condition so that a proportion of residual glass phase is less than 20% by weight and ceramicising the at least others of the glass plates at the second ceramisation condition so that a proportion of residual glass phase is less than 5% by weight.

20. The method of claim 19, wherein the composition is free of additions of Nd$_2$O$_3$.

* * * * *